(12) United States Patent
Flores

(10) Patent No.: US 9,382,792 B2
(45) Date of Patent: Jul. 5, 2016

(54) COILED TUBING DOWNHOLE TOOL

(71) Applicant: BAKER HUGHES INCORPORATED, Houston, TX (US)

(72) Inventor: Juan Carlos Flores, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 130 days.

(21) Appl. No.: 14/264,794

(22) Filed: Apr. 29, 2014

(65) Prior Publication Data

US 2015/0308255 A1    Oct. 29, 2015

(51) Int. Cl.
E21B 47/00     (2012.01)
E21B 47/01     (2012.01)
E21B 47/12     (2012.01)
E21B 19/22     (2006.01)

(52) U.S. Cl.
CPC ............... *E21B 47/00* (2013.01); *E21B 47/011* (2013.01); *E21B 47/124* (2013.01); *E21B 19/22* (2013.01); *E21B 47/01* (2013.01)

(58) Field of Classification Search
CPC ...... E21B 47/00; E21B 47/011; E21B 47/124
See application file for complete search history.

(56) References Cited

U.S. PATENT DOCUMENTS

| 6,269,891 | B1 | 8/2001 | Runia | |
| 7,874,359 | B2* | 1/2011 | Bissonnette | E21B 17/076 166/254.2 |
| 8,614,795 | B2* | 12/2013 | Duncan | G01H 9/004 356/477 |
| 2009/0194275 | A1* | 8/2009 | Bissonnette | E21B 17/076 166/250.01 |
| 2011/0272148 | A1 | 11/2011 | Lovell et al. | |
| 2012/0152550 | A1 | 6/2012 | East, Jr. | |
| 2013/0021615 | A1* | 1/2013 | Duncan | G01H 9/004 356/477 |
| 2013/0099935 | A1* | 4/2013 | Ujereh | E21B 47/011 340/854.7 |
| 2013/0255939 | A1 | 10/2013 | Kumaran et al. | |

FOREIGN PATENT DOCUMENTS

WO     WO2006040307     4/2006

OTHER PUBLICATIONS

International Search Authority; International Search Report and Written Opinion for Application No. PCT/US2015/026519 dated Jul. 20, 2015.

\* cited by examiner

*Primary Examiner* — Shane Bomar
(74) *Attorney, Agent, or Firm* — Parsons Behle & Latimer

(57) ABSTRACT

A method and system for determining information about a wellbore with coiled tubing. A downhole device may be positioned within coiled tubing and run down the wellbore to determine diagnostic information about a location with the wellbore. The downhole device may store diagnostic information in a storage device that may be analyzed when the device is returned to the surface. A downhole device may be connected to the end of a string of coiled tubing that includes a diagnostic device and memory sealed in a chamber. A flow path past the chamber is in communication with the coiled tubing string permitting the flow of fluid past the chamber. A downhole device including a diagnostic device may be connected to a recess in an exterior of a coiled tubing string.

11 Claims, 3 Drawing Sheets

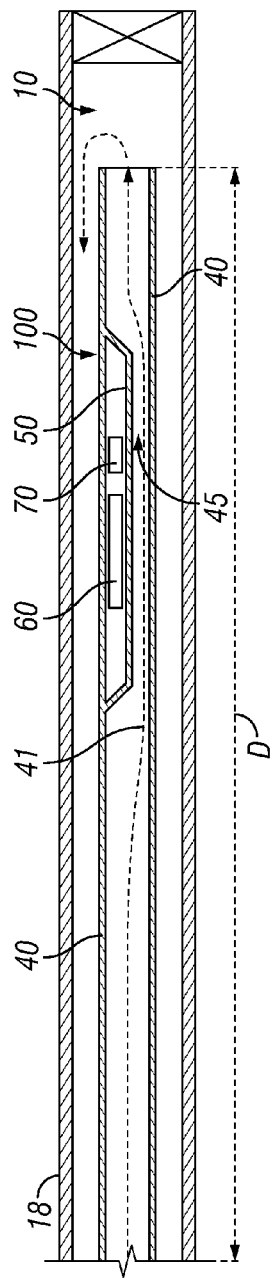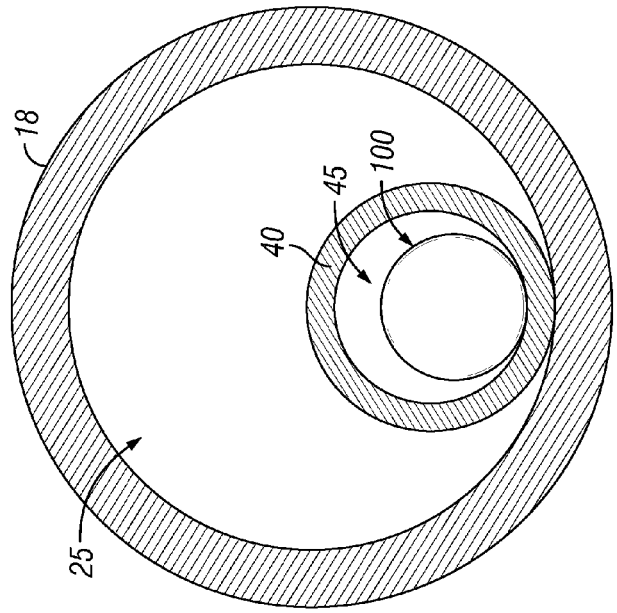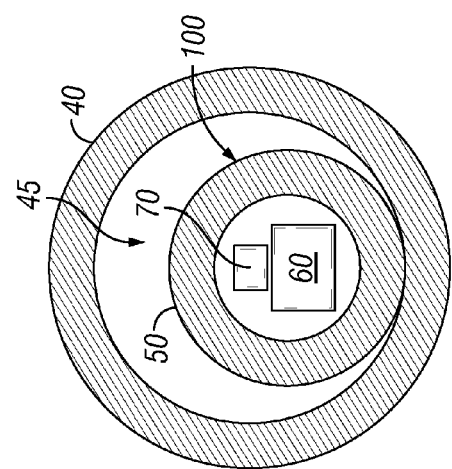

COILED TUBING DOWNHOLE TOOL

BACKGROUND

1. Field of the Disclosure

The embodiments described herein relate to a method and apparatus for a downhole device connected to coiled tubing to obtain diagnostic information of a wellbore. The downhole device may be connected to the interior of the coiled tubing. Alternatively, the downhole device may be connected to an exterior carrier portion of the coiled tubing.

2. Description of the Related Art

Natural resources such as gas and oil may be recovered from subterranean formations using well-known techniques. For example, a horizontal wellbore may be drilled within the subterranean formation. After formation of the horizontal wellbore, a string of pipe, e.g., casing, may be run or cemented into the well bore. Hydrocarbons may then be produced from the horizontal wellbore.

In an attempt to increase the production of hydrocarbons from the wellbore, the casing may be perforated and fracturing fluid may be pumped into the wellbore to fracture the subterranean formation. The fracturing fluid is pumped into the well bore at a rate and a pressure sufficient to form fractures that extend into the subterranean formation, providing additional pathways through which fluids being produced can flow into the well bores. The fracturing fluid typically includes particulate matter known as a proppant, e.g., graded sand, bauxite, or resin coated sand, that may be suspended in the fracturing fluid. The proppant becomes deposited into the fractures and thus holds the fractures open after the pressure exerted on the fracturing fluid has been released.

A production zone within a wellbore may have been previously fractured, but the prior fracturing may not have adequately fractured the formation leading to inadequate production from the production zone. Even if the formation was adequately fractured, the production zone may no longer be producing at adequate levels. Over an extended period of time, the production from a previously fractured horizontal wellbore may decrease below a minimum threshold level. One technique in attempting to increase the hydrocarbon production from the wellbore may be the re-fracturing of some of the previously fractured locations of the horizontal wellbore. However, it may not be beneficial to re-fracture every previously fractured location. It may be beneficial to use a diagnostic tool to analyze the production zones in a horizontal wellbore to determine which zones should be re-fractured.

FIG. 8 shows a prior art diagnostic tool 22 conveyed into a wellbore 10 on coiled tubing 40 via a wellhead 16. The coiled tubing 40 moves the diagnostic tool 22 down the wellbore 10 along the casing 18 until the diagnostic tool 22 is positioned at a desired location. The diagnostic tool 22 is connected to the surface via a cable 14, which transmits diagnostic information obtained from the device 22. The cable 14 and diagnostic tool 22 are connected to the end of the coiled tubing 40 via a cable head 20 and connector 21. Prior to running the diagnostic tool 22 into the wellbore 10, coiled tubing 40 may be run into the wellbore 10 to conduct a clean-out procedure. The coiled tubing 40 is then tripped out of the wellhead 16 and the diagnostic tool 22 and cable 14 may be connected to the coiled tubing 40 for a second trip into the wellbore 10 with the coiled tubing 40. The positioning of the cable 14 outside of the coiled tubing 40 as well as the diagnostic tool 22 being connected to end of the coiled tubing 40 may present an increased chance the coiled tubing 40 becomes stuck within the wellbore 10. It may also be beneficial to permit a cleanout procedure and conveyance of a diagnostic tool 22 into a wellbore in a single trip of coiled tubing 40.

SUMMARY

The present disclosure is directed to a downhole device connected to coiled tubing that substantially overcomes some of the problems and disadvantages discussed above.

One embodiment is a method of determining information about the production from a zone of a wellbore comprising running a downhole device into a wellbore. The device comprises an electronic device positioned inside of a housing within an interior of coiled tubing. The method includes positioning the downhole device adjacent a first zone of the wellbore, determining diagnostic information of the first zone of the wellbore, and storing the determined diagnostic information of the first zone in a memory device.

The method may include connecting the housing to the interior of coiled tubing. The method may include pumping fluid down the interior of the coiled tubing past the downhole device while determining diagnostic information of the first zone. The method may include positioning the downhole device adjacent a second zone of the wellbore, determining diagnostic information of the second zone of the wellbore, and storing the determined diagnostic information of the second zone in the memory device. The electronic device may be a logging tool. The method may include pulling the downhole device out of the wellbore and analyzing the diagnostic information of the first zone stored in the memory device.

One embodiment is a method of determining information about the production from a zone of a wellbore comprising running a downhole device into a wellbore. The downhole device comprises an electronic device positioned inside of a housing connected to a recess in an exterior of coiled tubing. The method includes positioning the downhole device adjacent a first zone of the wellbore, determining diagnostic information concerning the first zone of the wellbore, and storing the determined diagnostic information of the first zone in a memory device.

The electronic device may be a logging tool. The method may further comprise positioning the downhole device adjacent a second zone of the wellbore, determining diagnostic information of the second zone of the wellbore, and storing the determined diagnostic information of the second zone in the memory device. The method may include pulling the downhole device out of the wellbore and analyzing the diagnostic information of the first zone stored in the memory device.

One embodiment is a system to monitor a zone of a wellbore. The system comprises a string of coiled tubing and a housing having a first end and a second end. The housing is closed at the first end and is closed at the second end and at least one of the ends being selectively closed to permit access into the housing. The system includes an electronic device positioned within the housing. The electronic device is configured to obtain diagnostic information of a wellbore. The housing is connected to a portion of an interior of the string of coiled tubing with a flow path between the housing and the interior of the string of coiled tubing.

The electronic device may be a logging tool. The system may include a memory storage device connected to the electronic device. The housing may be welded to the interior of the string of coiled tubing. The housing may be positioned between an end of the string of coiled tubing and a location ten feet from the end of the string of coiled tubing, the location being along the string of coiled tubing.

One embodiment is a system to monitor a zone of a wellbore. The system comprises a string of coiled tubing and a housing having a first end and a second end. The housing is closed at the first end and is closed at the second end and at least one of the ends being selectively closed to permit access into the housing. The system includes an electronic device positioned within the housing. The electronic device is configured to obtain diagnostic information of a wellbore. The housing is connected to a recess in a portion of an exterior of the string of coiled tubing with a flow path in an interior of the string of coiled tubing past the recess.

The electronic device may be a logging tool. The system may include a memory storage device connected to the electronic device. The housing may be welded to the exterior of the string of coiled tubing. The housing may be positioned between an end of the string of coiled tubing and a location ten feet from the end of the string of coiled tubing, the location being along the string of coiled tubing.

One embodiment is a system to monitor a wellbore. The system comprises a string of coiled tubing and a housing having a first end, a second end, at least one inner wall forming a cavity, and a flow path from the first end to the second end. The cavity is selectively sealed from the flow path. The housing is connected to an end of the string of coiled tubing. The system includes an electronic device positioned within the selectively sealed cavity of the housing. The electronic device is configured to obtain diagnostic information of a wellbore. The system includes a memory storage device connected to the electronic device. The memory storage device is positioned within the selectively sealed cavity of the housing.

BRIEF DESCRIPTION OF THE DRAWINGS

FIG. 1 shows an embodiment of a downhole device positioned within a housing inside of coiled tubing;

FIG. 2 shows an end cross-section view of an embodiment of a downhole device positioned within a housing inside of coiled tubing;

FIG. 3 shows an end cross-section view of an embodiment of a downhole device positioned within a housing inside of coiled tubing within casing;

Figure 4:
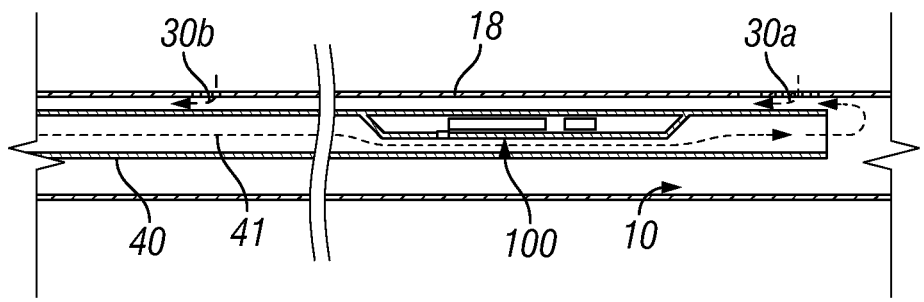
FIG. 4 shows an embodiment of a downhole device positioned adjacent a first zone of a wellbore.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows an embodiment of a downhole device 100 that may be connected to the interior of coiled tubing 40. The downhole device 100 may include a housing 50 that is connected to the inside of the coiled tubing 40. The housing 50 may be connected to the inside of the coiled tubing 40 by various mechanisms such as would be appreciated by one of ordinary skill in the art having the benefit of this disclosure. For example, the housing 50 could be welded to the interior of the coiled tubing 40. An electronic device 60 configured to monitor various aspects of a production zone (e.g. 30a or 30b shown in FIG. 4 and FIG. 5) of a wellbore 10 is positioned within the housing 50. The coiled tubing 40 is used to run the device 100 down a wellbore 10 within casing or tubing 18 and position the electronic device 60 of the downhole device 100 at a desired location within the wellbore 10. The ends of the housing 50 are closed so that fluid flows around the housing through a flow area 45 (shown in FIG. 2) between the housing 50 and the coiled tubing 40 as shown by arrows 41 in FIG. 1. The positioning of the downhole device 100 inside of the coiled tubing 40 may permit the attachment of a bottom hole assembly to the bottom of the coiled tubing 40 that is adapted for other purposes. A conventional logging tool connected to the bottom of the coiled tubing 40 may prevent the connection of an additional bottom hole assembly to the coiled tubing 40.

The downhole device 100 is preferably connected to the interior of the coiled tubing 40 near the downhole end of the coiled tubing. For example, the downhole device 100 may be positioned flush with the end of the coil or between the end of the coiled and ten (10) feet from the end of the coiled tubing 40. FIG. 1 shows a distance, D, from the end of the coiled tubing 40 within which the downhole device 100 is preferably positioned within. The distance, D, may be various lengths. For example, D may be two (2) feet, which is approximately shown in FIG. 1. However, this distance is for illustrative purposes only and may be varied as would be appreciated by one of ordinary skill in the art having the benefit of this disclosure. Preferably, the distance D may be approximately ten (10) feet. Coiled tubing 40 is often inserted into a wellbore 10 to perform a cleaning operation prior to other wellbore operations. The insertion of the downhole device 100 inside of the coiled tubing 40 permits the transmittal of an electronic device 60, which may be a diagnostic tool, into the wellbore 10 during the cleaning trip into the wellbore 10. The housing 100 connected inside of the coiled tubing 40 may provide added protection as the electronic device 60, which may be fragile, is tripped in and out of the wellbore 10. The addition of the housing 50 to the end of the coiled tubing string 40 may provide higher rigidity at the end of the coiled tubing string 40, which may aid in the insertion of the coiled tubing string 40 into a wellbore 10, in particular if the wellbore 10 is a horizontal wellbore.

FIG. 2 shows an end cross-section view of the downhole device 100 connected to an interior portion of the coiled tubing 40 creating a flow path 45 between the housing 50 of the device 100 and the rest of the interior of the coiled tubing 40 that is not connected to the housing 50. The outer diameter of the housing 50 may be configured to permit an adequate flow path past the housing 50. The housing 50 encloses an electronic device 60 that may be used to analyze the condition of the wellbore 10 and its surroundings. For example, the electronic device 60 may be a logging tool also referred to as a diagnostic tool. The diagnostic information gathered from the electronic device 60 may be stored on a memory device 70 also positioned within the housing 50. The diagnostic information stored on the memory device 70 may then be analyzed after the device 100 is removed from the wellbore 10. FIG. 3 shows an end cross-section view of a downhole device 100 connected to coiled tubing 40 positioned within casing, or tubing, 18 of a wellbore. The device creates a flow area 45 between the housing 50 of the device 100 and the coiled tubing 40. Likewise, the coiled tubing 40 creates a flow area 25 between the exterior of the coiled tubing 40 and the casing 18. The flow area 45 between the housing 50 and the coiled tubing 40 may permit the pumping of fluid down the coiled tubing 40 during the capturing of diagnostic information from the electronic device 60. The housing 50 may also act as a fluid displacer, which may enhance the response on neutralizing wellbore fluids.

FIG. 4 shows the downhole device 100 connected to coiled tubing 40 being positioned adjacent a first zone 30a of a wellbore 10. The electronic device 60 of the downhole device may be used to determine whether the first zone 30a should be re-fractured during a re-fracturing procedure. For example, the downhole device 100 may be run into the wellbore 10 to determine which locations of the wellbore should be re-fractured by the process disclosed in related and commonly owned U.S. patent application Ser. No. 14/091,677 filed on Nov. 27, 2013 entitled System and Method for Re-fracturing Multizone Horizontal Wellbore, which is incorporated by reference herein in its entirety.

The electronic device 60 of the downhole device may be adapted to obtain various information about a desired location of a wellbore 10. The diagnostic device 60 of the downhole device 100 may provide information concerning the temperature, pressure, fluid flow, and formation. The electronic device 60 may use various mechanisms to obtain diagnostic information as would be appreciated by one of ordinary skill in the art having the benefit of this disclosure. For instance, the device 60 may generate pulsed neutrons that penetrate the housing 50 and reflect off the wellbore fluid as well as the wellbore 10 and surrounding formation measuring its activity. All of the diagnostic information gathered by the electronic device 60 may be stored in the memory device 70 for later analysis.

Figure 5:
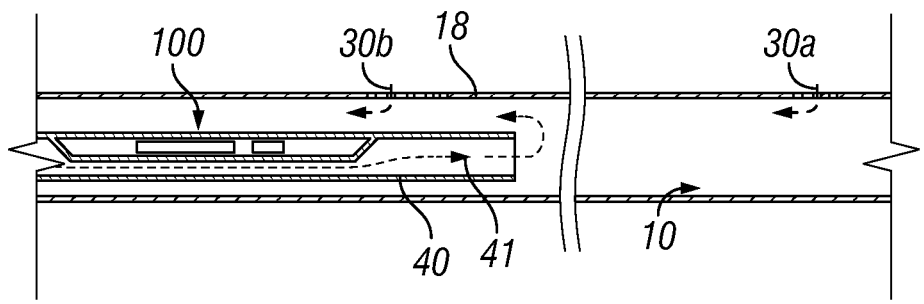
FIG. 5 shows an embodiment of a downhole device positioned adjacent a second zone of a wellbore.

The coiled tubing 40 may be used to position the downhole device 100 adjacent a first zone 30a of a wellbore 10 so that the electronic device 60 may obtain diagnostic information concerning the first zone 30a. This diagnostic information is stored in the memory device 70 and may be used later to determine whether it would be beneficial to re-fracture the first zone 30a during a re-fracturing process. After storing the diagnostic information for the first zone 30a, the coiled tubing 40 may be used to position the downhole device 100 adjacent a second zone 30b of the wellbore 10 as shown in FIG. 5. The electronic device 60 may then obtain diagnostic information concerning the second zone 30b, which may be stored in the memory device 70. This process may be repeated until all desired locations within the wellbore 10 have been analyzed by the electronic device 60.

Figure 6:
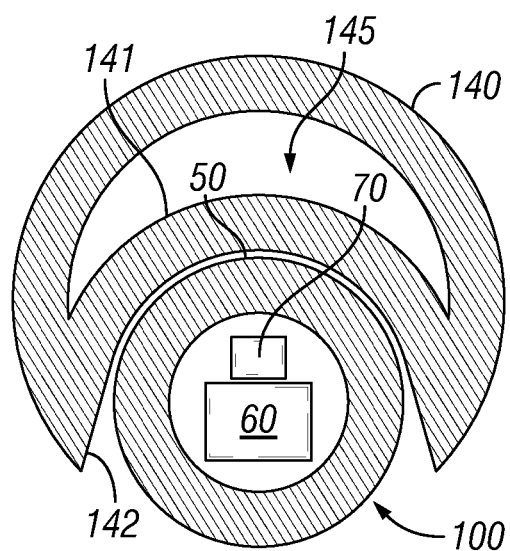
FIG. 6 shows an embodiment of a downhole device positioned within a housing connected to the outside of coiled tubing.

FIG. 6 shows an end cross-section view of an embodiment of a downhole device 100 connected to the exterior of coiled tubing 140. The coiled tubing 140 includes a carrier portion 141, which is a concave portion that creates a recess for the placement of downhole device 100. The housing 50 of the downhole device 100 may be connected to the recess in the coiled tubing 140 by various means. For example, the housing 50 may be welded to the carrier portion 141 of the coiled tubing 140. The carrier portion 141 may be connected to coiled tubing 140 at connection points 142. For example, the carrier portion 141 may be welded to the coiled tubing at connection points 142. The carrier portion 141 may be formed from crimping the coiled tubing 140 to form bends at connection points 142 forming a recess for the positioning of the downhole device 100. The coiled tubing 140 includes a flow path 145 between the interior of the coiled tubing 140 and the carrier portion 141. The downhole device 100 includes an electronic device 60 used to diagnose conditions of the wellbore 10 and memory device 70 protected by housing 50. The coiled tubing 140 may be used to positioned the downhole device 100 at desired locations within the wellbore 10 to obtain diagnostic information as detailed herein. As shown in FIG. 6, the addition of the downhole device 100 to the coiled tubing 140 may result in substantially the same outer diameter of the coiled tubing 140 if it did not contain the carrier portion 141.

Figure 7:
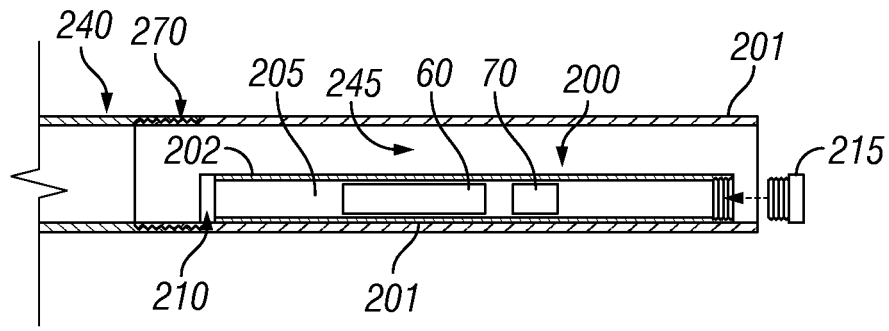
FIG. 7 shows an embodiment of a downhole device that may be connected to the end of coiled tubing.
Figure 8:
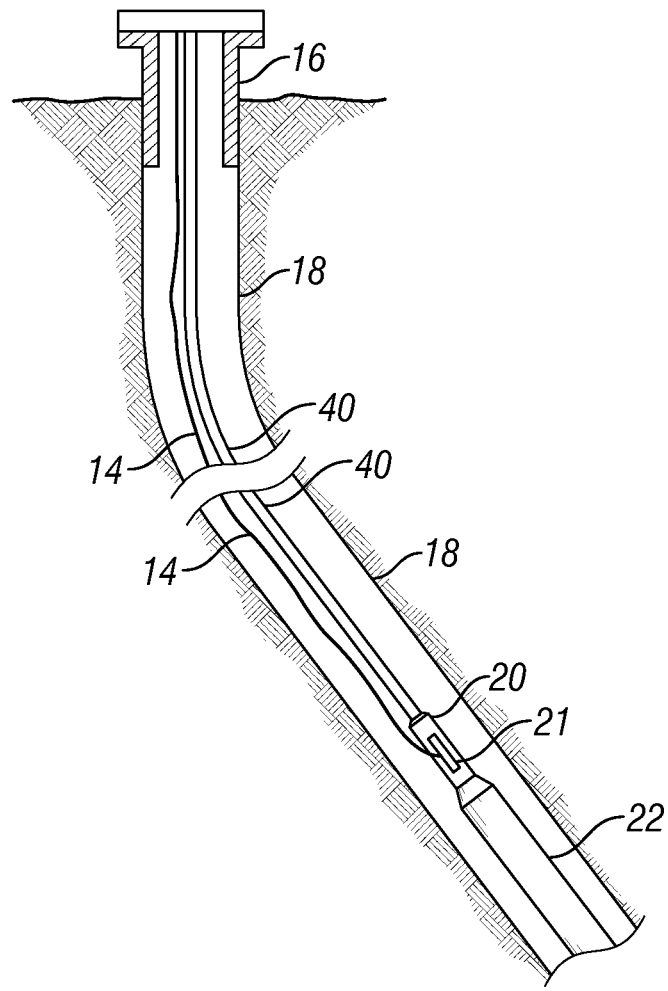
FIG. 8 shows a prior art downhole device connected to coiled tubing.

FIG. 7 shows an exploded view of an embodiment of a downhole device 200 that may be connected to the end of a coiled tubing string 240 by a connector 270. The downhole device 200 includes an electronic device 60 that is configured as a wellbore diagnostic tool and a memory device 70 positioned within a cavity 205 within the downhole device 200. As disclosed herein, the electronic device 60 may be positioned at various locations within the wellbore to obtain information concerning the wellbore 10 that may be stored in the memory device 70 for later analysis. The downhole device 200 may be formed by machining a housing 201 that includes an flow path 245 that is in communication with the interior of the coiled tubing 240 and a cavity that is formed by inner wall 202 and end caps 210 and 215. End caps 210 and 215 seal the cavity 205 from fluids flowing through the flow path 245 of the downhole device. One or both of the end caps 210 and 215 may be selectively disconnected form the cavity 205 to permit access to the cavity 205 as would be appreciated by one of ordinary skill in the art having the benefit of this disclosure. The end caps 210 and 215 may be connected to the cavity 205 by various mechanisms as would be appreciated by one of ordinary skill in the art having the benefit of this disclosure. Various mechanisms may be used to selectively seal the chamber 205 from the flow path 245 within the device 200. For example, one end may be permanently closed with the other including a removable plugging element.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A method of determining information about the production from a zone of a wellbore comprising:
running a downhole device into a wellbore, the downhole device comprising an electronic device positioned inside of a housing within an interior of coiled tubing;
positioning the downhole device adjacent a first zone of the wellbore;
determining diagnostic information of the first zone of the wellbore while the electronic device is positioned entirely inside the housing within the interior of coiled tubing ; and
storing the determined diagnostic information of the first zone in a memory device.

2. The method of claim 1, further comprising connecting the housing to the interior of coiled tubing.

3. The method of claim 2, further comprising pumping fluid down the interior of the coiled tubing past the downhole device while determining diagnostic information of the first zone.

4. The method of claim 1, further comprising:
positioning the downhole device adjacent a second zone of the wellbore;
determining diagnostic information of the second zone of the wellbore; and storing the determined diagnostic information of the second zone in the memory device.

5. The method of claim 1, wherein the electronic device of the downhole device comprises a logging tool.

6. The method of claim 1, further comprising pulling the downhole device out of the wellbore and analyzing the diagnostic information of the first zone stored in the memory device.

7. A system to monitor a zone of a wellbore comprising:
a string of coiled tubing;
a housing having a first end and a second end, the housing being closed at the first end and being closed at the second end at least one of the first end and second end being selectively closed to permit access into the housing;
an electronic device positioned within the housing, the electronic device configured to obtain diagnostic information of a wellbore; and
the housing being connected to a portion of an interior of the string of coiled tubing with a flow path between the housing and the interior of the string of coiled tubing, the electronic device configured to obtain the diagnostic information of the wellbore while within the housing within the interior of the string of coiled tubing.

8. The system of claim 7, wherein the electronic device is a logging tool.

9. The system of claim 7, further comprising a memory storage device connected to the electronic device.

10. The system of claim 7, wherein the housing is welded to the interior of the string of coiled tubing.

11. The system of claim 7, wherein the housing is positioned between an end of the string of coiled tubing and a location ten feet from the end of the string of coiled tubing along the string of coiled tubing.

* * * * *